Patented Apr. 16, 1935

1,997,583

UNITED STATES PATENT OFFICE 1,997,583

COMPOSITION OF MATTER AND MATERIAL MADE THEREFROM

Maurice Valentine Hitt, Wilmington, Del., assignor to E. I. du Pont de Nemours & Company, Wilmington, Del., a corporation of Delaware No Drawing. Application September 28, 1933, Serial No. 691,357

13 Claims. (Cl. 91—68)

This invention relates to a moistureproof material and more particularly to a moistureproofing composition adapted to produce a moistureproof, transparent, flexible coating or film which is capable of being sealed to itself, to form a substantially rugged and strong joint, by the simple application of heat and pressure.

Recently, there has appeared on the market a moistureproof material which consists of a base of regenerated cellulose thinly coated on both sides thereof with a moistureproofing composition comprising, in its preferred form, nitrocellulose, a gum or resin, a plasticizer and paraffin. This material, which is fully disclosed in United States Patent 1,737,187, in addition to being moistureproof, is glass-clear in transparency, possesses marked flexibility and good surface slip. By virtue of these characteristics, the product has attained widespread and extensive use as a wrapping tissue, particularly in the packaging of materials which are desired to be exhibited to view and which are subject to deterioration by gain or loss of moisture.

The effectiveness of the use of the aforementioned material as a wrapping tissue for products susceptible to change in their original moisture content is dependent to a great extent on the strength of the joint or closure constituting the seal of the wrapper. When the seal or closure was made by the so-called solvent-sealing processes which contemplated applying a solvent, such as acetone or methyl ether of ethylene glycol (commonly termed methyl "Cellosolve"), to at least one of the juxtaposed surfaces prior to uniting or joining the same by pressure, there was produced a seal which was quite effective. However, as the use of this material progressed and the packaging accomplished by packing machines, it was desirable and advantageous to seal or join the material by the use of heat and pressure alone. The product of United States Patent 1,737,187, above mentioned, upon the application of heat and pressure alone, formed a joint or closure which was very much weaker than that secured by the aforementioned method of solvent sealing. The heat-sealed joint was satisfactory for many purposes and particularly for uses where a rugged seal or closure was not desired, such as in wrapping cigars. In the wrapping of cigars, the material constituting the wrapper was wrapped around the cigar and folded in position by means of heat and manipulation, with the result that on cooling it did not spring away from the cigar. The overlapped portions were superficially joined and the ends of the wrapper were folded over, thus assisting in maintaining the wrapper in position. Finally, the cigar was laid in a protecting box and handled carefully. Under these conditions, the seal which resulted was effective for the particular purpose. Such a seal, however, was not effective in the wrapping of materials where a substantially strong and rugged joint or closure was desired. A rugged seal or closure could only be secured by the solvent-sealing process above mentioned. This becomes obvious when the strengths of the joints are compared. A joint produced by solvent sealing of the aforementioned material with acetone and heat is of the order of 40 times stronger than a comparable joint produced with heat sealing. When methyl "Cellosolve" is employed in the solvent-sealing process, the joint is of the order of 75 times stronger than a similar joint produced with heat sealing.

I have found that I can produce a moistureproof, transparent and flexible material having good surface characteristics and which can be heat sealed, i. e. sealed to itself by the simple application of heat and pressure only to produce a joint which is relatively strong and rugged and which is stronger than a similar joint produced by solvent sealing of the same material with acetone by employing a miostureproofing composition more fully described hereafter.

It is, therefore, an object of this invention to provide a moistureproofing composition which will deposit a moistureproof, transparent and flexible coating or film having good surface characteristics, said coating or film being capable of being sealed to itself by the simple operation of applying heat and pressure to produce a joint, seal or closure which is materially stronger than a joint of the same dimensions produced by heat sealing analogous moistureproof, transparent and flexible films or coatings of the same thickness.

Another object of this invention is to provide a transparent, moistureproof and flexible material having good surface characteristics, especially suitable for use as a wrapping tissue, and which can be heat sealed to produce a joint, seam or closure which is stronger than that secured when the same material is solvent sealed with acetone to produce a joint of the same size.

Other objects of the instant invention will become apparent from the following description and appended claims.

In accordance with the principles of the instant invention, I provide a moistureproofing composition which, when cast or coated on to a base and the solvent evaporated at an elevated temperature, yields a film or coating which is moistureproof, flexible, transparent, heat sealable and has a good surface slip.

This moistureproofing composition contains no significant proportion of individual thermoplastic substances but contains coating ingredients which mutually cooperate to develop the heat-sealable film. Specifically, the composition is characterized by a combination of a pyroxylin having certain characteristics and a plasticizer, said combination at slightly elevated temperatures being capable of sealing to itself or other bodies. The composition is further characterized by the presence of a wax or waxy substance which imparts the moistureproofness to the final film. In certain embodiments thereof, the composition may also contain a blending agent.

As the pyroxylin, I prefer to employ a pyroxylin which can be well plasticized by plasticizers at a slightly elevated temperature. I also prefer to use such a pyroxylin as will tolerate a relatively large amount of plasticizer without becoming tacky, especially when the sheets of the final product are dried and stacked. Satisfactory results have been secured when a pyroxylin having a nitrogen content between 10.5% and 11.4% is employed. In general, the lower the nitrogen content of the pyroxylin in the range just mentioned, the greater the tolerance for plasticizers. In so far as the viscosity is concerned, I prefer to use a pyroxylin having a Hercules viscosity of 8–14 seconds, although pyroxylins, of the above-mentioned type, having greater or lesser viscosities may be successfully employed.

For the plasticizer, I prefer to use a solvent softener which will well plasticize the pyroxylin. I also prefer to use one which does not contribute an odor, taste or color to the final film and which can be used in relatively large quantities and produce a satisfactory surface. As several illustrative examples may be mentioned dibutyl phthalate, benzyl butyl phthalate, butyl benzoyl benzoate, cyclohexyl butyl phthalate, dicyclohexyl adipate, triphenyl phosphate, tricresyl phosphate, etc. or mixtures of these and/or similar materials.

The proportion of plasticizer to be used with regard to the pyroxylin naturally varies with the plasticizer an pyroxylin. By this I mean that a plasticizer which is a very good solvent for pyroxylin will be used in lesser amounts, especially when an easily plasticizable pyroxylin is used, than that required when these conditions are not present. In general, I have found that quantities of 4–12 parts by weight of plasticizer to 10 parts by weight of pyroxylin, and preferably 5–8 parts, will be found to be useful, depending upon the particular plasticizer and the nitrogen content and solubility of the particular pyroxylin.

As above mentioned, waxes or wax-like substances in this system afford the basis for the moistureproofness of the final film. As the preferred moistureproofing constituent, a high melting point paraffin, such as one having a melting point in excess of 50° C., such as 55° C., 60° C. or higher, since it is odorless, colorless, cheap and tends to give a very high degree of moistureproofness, is contemplated. In other circumstances, of course, I can use lower melting paraffins or other waxes, such as palm wax, candelilla, ceresin, beeswax, purified shellac wax, etc. or mixtures of waxes. Satisfactory results are obtained when the wax or wax mixture is present in quantities of 0.1 to 1.0 part, by weight, based on 10 parts by weight, on the pyroxylin.

In certain embodiments of the invention, to gain the highest degree of compatibility between the several coating ingredients, which is reflected in the transparency and moistureproofness of the final film, I have found that a small amount of a blending agent is desirable. As the blending agent, I prefer resins, such as waxfree dammar and ester gum, as well as similar resins. However, I may also use as blending agents such materials as japan wax, spermaceti, castor oil phthalates, phthalates of other hydroxy fatty acids, and other materials which are characterized in general by a low melting point and a solubility in both hydrocarbon solvents and hydroxyl-containing solvents and which are compatible in all proportions with molten wax.

It is to be understood that, when a resin is employed as the blending agent, it is used in relatively small amounts and that it does not materially contribute to the heat-sealing properties of the final film. When a blending agent is used, I prefer about 1–2 parts thereof based on 10 parts of pyroxylin, although smaller amounts, such as even down to 0.1 part to 10 parts of pyroxylin may be used, the parts being by weight.

The preferred composition, as hereinbefore described, in accordance with the constituents of the final film consists of 10 parts of a well plasticizable pyroxylin having a nitrogen content of 10.5%–11.4%, 5–8 parts of a solvent plasticizer, which is a good plasticizer for the pyroxylin, and 0.1–1.0 part of a wax and preferably 1–2 parts of a blending agent.

In order to more fully explain the nature of the invention, the following illustrative examples are set forth, in which the parts are parts by weight:

*Example I*

| | |
|---|---|
| Pyroxylin (11.4% N) | 10.0 |
| Dibutyl phthalate | 6.9 |
| Paraffin (M. P. 60° C.) | 0.5 |
| Wax free dammar | 1.4 |

*Example II*

| | |
|---|---|
| Pyroxylin (11.0% N) | 10.0 |
| Triphenyl phosphate | 8.0 |
| Paraffin (M. P. 60° C.) | 0.5 |
| Wax free dammar | 1.5 |

*Example III*

| | |
|---|---|
| Pyroxylin (10.5% N) | 10.0 |
| Dibutyl phthalate | 7.5 |
| Paraffin (M. P. 60° C.) | 0.3 |
| Ester gum | 1.5 |

*Example IV*

| | |
|---|---|
| Pyroxylin (11.4% N) | 10.0 |
| Triphenyl phosphate | 7.0 |
| Spermaceti | 0.5 |
| Ester gum | 1.0 |

*Example V*

| | |
|---|---|
| Pyroxylin (11.4% N) | 10.0 |
| Cyclohexyl butyl phthalate | 7.5 |
| Paraffin wax (M. P. 60° C.) | 0.15 |

The film is not quite as clear as with those containing dammar or ester gum, but it is quite passable in this respect. It it suitable for use with a base of glassine paper where the highest degree of clarity is not so essential.

*Example VI*

| | |
|---|---|
| Pyroxylin (11.4% N) | 10.0 |
| Benzyl butyl phthalate | 7.5 |
| Paraffin (M. P. 60° C.) | 0.2 |
| Japan wax | 0.3 |

Example VII

| | |
|---|---|
| Pyroxylin (11.4% N) | 10.0 |
| Tricresyl phosphate | 8.0 |
| Paraffin (M. P. 60° C.) | 0.4 |
| Wax free dammar | 1.0 |
| Refined, bleached, wax free shellac | 1.0 |

Example VIII

| | |
|---|---|
| Pyroxylin (11.4% N) | 10.0 |
| Dibutyl phthalate | 7.0 |
| Candelilla wax | 0.5 |
| Ester gum | 2.0 |

The film constituents are dissolved in a suitable solvent mixture, which naturally will vary with the character and quantity of the film constituents, with the base to be coated, and also with the particular coating process i. e. hand or machine, and to a slight degree with the type of machine used. In general, a solvent mixture containing absolute ethyl acetate, toluene and ethyl alcohol will be found to give good results. For example, I may employ:

| | Range | Preferred |
|---|---|---|
| | Per cent | Per cent |
| Absolute ethyl acetate | 80–50 | 58 |
| Toluene | 50–20 | 30 |
| Ethyl alcohol | 3–40 | 12 |
| | | 100 |

If desired, to the aforementioned solvent mixtures, small percentages of high boiling solvents, such as methyl "Cellosolve", butyl alcohol and isobutyl alcohol, may be used to promote clarity. Also, high boiling esters and other hydrocarbons, both aromatic and aliphatic, can be used if desired. In general, however, the lower boiling solvents are preferred because of the greater ease of solvent elimination which affects odor if this is important. It is also to be understood that coloring agents, surface modifying agents, such as zinc stearate, and the like may also be incorporated in the composition.

The ratio of solids to solvents will, of course, be adjusted to the problem in hand, but a solution containing 8%–20% of solids will be found to be generally satisfactory.

The final film constituents are dissolved in any convenient manner in the chosen solvent mixture and thereafter the solution is either cast to form self-sustaining films or else coated on to the selected base. For convenience and brevity, the procedure will be described in connection with the coating process.

In accordance with this procedure, the chosen composition is applied to the selected base in any suitable manner, such as by immersion, spraying or dipping, and, after the excess composition has been conveniently removed, substantially all of the solvent is evaporated at an elevated temperature. The temperature is preferably at least equal to the melting point of the wax in the composition. When the base is of the type which loses moisture during the process, such as a sheet or film of regenerated cellulose, the coated film, after the evaporation of the solvents may be subjected to a humidifying treatment in a warm atmosphere. This humidifying treatment also serves to remove residual solvents.

As the base, I may use various materials, such as cellulosic materials, paper, albuminous materials, such as gelatin, agar-agar, casein, films made from a rubber derivative (Plioform) and the like. In the preferred embodiment of the invention, a non-porous, non-fibrous, dense, smooth surface material, such as regenerated cellulose, cellulose ester films, such as cellulose nitrate and cellulose acetate, or cellulose ether films, such as ethyl cellulose, benzyl cellulose, or glycol cellulose, is employed. As previously explained, solvent adjustment may be necessary, depending on the particular base employed.

The composition may be coated on to the base to give a wide range of coating thickness, and the degree of heat sealing will increase with a given composition with increase in thickness of the coating. For the purpose of this invention, and particularly where the ultimate product is to be used as a wrapping tissue, the coating thickness is 0.00002 to 0.0005 inch and preferably 0.00005 inch on each side of the base.

A sheet or film of regenerated cellulose having a coating of the thickness mentioned and formed of the composition hereinbefore described is truly heat sealable and will produce a seal which is stronger than that produced when the material is solvent sealed with acetone. As a matter of fact, the seal is at least as strong as that produced when the material is solvent sealed with methyl "Cellosolve". Additionally, the material is moistureproof, transparent, flexible, and is characterized by a good surface slip. The material, by virtue of its characteristics, is admirably suitable as a wrapping tissue.

The properties described in the paragraph immediately preceding also apply to the films per se and the products obtained when the other transparent bases are coated.

The following test has been devised to determine and test the strength of the various joints mentioned in the specification:

Strips of the coated material 1.5 inches wide are superposed on one end, so that the opposite faces of the film are in contact. A seal is made across the width of the material by imposing thereon a heated iron weighing 1,500 grams for 2 seconds. The iron is so designed as to cause a seal to be made of a width of $\tfrac{3}{32}$ of an inch, the iron being maintained in any suitable manner at a temperature above 130° C. and below 200° C. as, for instance 150° C. Two strips so sealed are opened at the free end and placed in a stretching device, such as a Suter testing machine, by gripping each end of the sheet in suitable clamps, one of which is fixed and the other of which is moved away at a constant speed of 12" per minute. The force in grams required to pull the sheets apart is taken as a measure of the strength of the bond and is referred to herein as "heat-sealing value".

When a sheet or film of regenerated cellulose having a coating thickness for the two sides of about 0.0001 inch and which conforms to a coating having about 3 grams of lacquer solids per square meter for both sides and is formed of a composition, such as illustrated in Example I, is heat sealed, solvent sealed with methyl "Cellosolve", and solvent sealed with acetone, and subjected to the test previously described, the following results are secured:

| Heat sealed | Methyl "Cellosolve" | Acetone |
|---|---|---|
| Grams | Grams | Grams |
| 200 | 150 | 90 |

The solvent-sealed film was prepared by moistening with a solvent, sealing with the sealing iron at the temperatures mentioned in the test, and removing excess solvent by drying in an oven at 65° C. for one hour before testing.

It is thus apparent that the compositions hereindescribed are indeed heat sealable and produce strong, rugged seals when heat sealed. These seals are stronger than similar seals produced by solvent sealing of the same material with acetone. They are, furthermore, at least equal in strength to similar seals produced by solvent sealing with methyl "Cellosolve". Compared to the prior art material, the heat-sealed joints of materials produced in accordance with the instant invention, as tested by the method previously described, are approximately at least 100 times as effective as the heat-seated joints of the prior art material. In fact, the heat-sealed joints of the instant invention are even several times better than the solvent-sealed joints of the prior art material.

By the term "moistureproof" as employed in this specification is meant the ability of a sheet or film of regenerated cellulose of a thickness of 0.0009 inch and having a coating on both sides, the total thickness of both coatings being not more than 0.0005 inch which conforms to a coating having about 15 grams of lacquer solids per square meter for both sides, to resist the passage or penetration of moisture or water vapor therethrough to an extent at least 10 times, and preferably 15, 20, 30, 40, 50, 100 or indeed more times, as effective as a sheet or film of regenerated cellulose of the same thickness, when tested in accordance with the test set forth in the Journal of Industrial and Engineering Chemistry on page 575, Vol. 21, No. 6 (June 1929).

Since it is obvious that various changes and modifications may be made in the above description without departing from the nature and spirit thereof, this invention is not restricted thereto except as defined in the appended claims.

I claim:

1. A composition comprising a pyroxylin having a nitrogen content of from 10.5% to 11.4%, a plasticizer of the solvent softener type for said pyroxylin, a wax, and a solvent mixture, the said ingredients being present in such proportions as to deposit upon the evaporation of the solvents a thin, transparent, moistureproof, flexible film having good surface slip and heat sealable to produce a joint which is stronger than a similar joint produced when said film is solvent sealed with acetone.

2. A composition comprising a pyroxylin having a nitrogen content of from 10.5% to 11.4%, a plasticizer of the solvent softener type for said pyroxylin, a wax, a blending agent, and a solvent mixture, the said ingredients being present in such proportions as to deposit upon the evaporation of the solvents a thin, transparent, moistureproof, flexible film having good surface slip and heat sealable to produce a joint which is stronger than a similar joint produced when said film is solvent sealed with acetone.

3. A composition comprising 10 parts of a pyroxylin having a nitrogen content of from 10.5% to 11.4%, 4 to 12 parts of a plasticizer of the solvent softener type, 0.1 to 1.0 part of a wax, the parts being by weight, and a solvent mixture in which the ingredients constituting the final film are soluble, said composition upon the evaporation of the solvent mixture depositing a thin, transparent, moistureproof, flexible film having good surface slip and heat sealable to produce a joint which is stronger than a similar joint produced when said film is solvent sealed with acetone.

4. A composition comprising 10 parts of a pyroxylin having a nitrogen content of from 10.5% to 11.4%, 4 to 12 parts of a plasticizer of the solvent softener type, 0.1 to 1.0 part of a wax, 1 to 2 parts of a blending agent, the parts being by weight, and a solvent mixture in which the ingredients constituting the final film are soluble, said composition upon the evaporation of the solvent mixture depositing a thin, transparent, moistureproof flexible film having good surface slip and heat sealable to produce a joint which is stronger than a similar joint produced when said film is solvent sealed with acetone.

5. A composition comprising 10 parts of a pyroxylin having a nitrogen content of from 10.5% to 11.4%, 5 to 8 parts of a plasticizer of the solvent softener type, 0.1 to 1.0 part of a wax, the parts being by weight, and a solvent mixture in which the ingredients constituting the final film are soluble, said composition upon the evaporation of the solvent mixture depositing a thin, transparent, moistureproof, flexible film having good surface slip and heat sealable to produce a joint which is stronger than a similar joint produced when said film is solvent sealed with acetone.

6. A composition comprising 10 parts of a pyroxylin having a nitrogen content of from 10.5% to 11.4%, 5 to 8 parts of a plasticizer of the solvent softener type, 0.1 to 1.0 part of a wax, 1 to 2 parts of a blending agent, the parts being by weight, and a solvent mixture in which the ingredients constituting the final film are soluble, said composition upon the evaporation of the solvent mixture depositing a thin, transparent, moistureproof, flexible film having good surface slip and heat sealable to produce a joint which is stronger than a similar joint produced when said film is solvent sealed with acetone.

7. A composition comprising 10 parts of pyroxylin having a nitrogen content of 11.4%, 6.9 parts of dibutyl phthalate, 0.5 part of paraffin having a melting point of 60° C., 1.4 parts of wax free dammar, the parts being by weight, and a solvent mixture in which the ingredients constituting the final film are soluble, said composition, upon the evaporation of the solvent mixture, depositing a thin, transparent, moistureproof, flexible film having a good surface slip and heat sealable to produce a joint which is stronger than a similar joint produced when said film is solvent sealed with acetone.

8. A composition comprising 10 parts of pyroxylin having a nitrogen content of 10.5%, 7.5 parts of dibutyl phthalate, 0.3 part of a paraffin having a melting point of 60° C., 1.5 parts of ester gum, the parts being by weight, and a solvent mixture in which the ingredients constituting the final film are soluble, said composition, upon the evaporation of the solvent mixture, depositing a thin, transparent, moistureproof, flexible film having a good surface slip and heat sealable to produce a joint which is stronger than a similar joint produced when said film is solvent sealed with acetone.

9. A composition comprising 10 parts of pyroxylin having a nitrogen content of 11.4%, 8 parts of tricresyl phosphate, 0.4 part of a paraffin having a melting point of 60° C., 1.0 part of wax free dammar, 1.0 part of refined, bleached, wax free shellac, the parts being by weight, and a solvent mixture in which the ingredients constituting the final film are soluble, said composition, upon the evaporation of the solvent mixture, depositing a thin, transparent, moistureproof, flexible film having a good surface slip and heat sealable to produce a joint which is stronger than a similar joint produced when said film is solvent sealed with acetone.

10. A wrapping tissue comprising a base thinly coated on both sides thereof with a composition comprising pyroxylin having a nitrogen content of from 10.5% to 11.4%, a plasticizer of the solvent softener type for the pyroxylin, and a wax, the ingredients of the coating being present in such proportions as to provide a transparent, moistureproof, flexible coating having good surface slip and heat sealable to produce a joint which is stronger than a similar joint produced when the material is solvent sealed with acetone.

11. A wrapping tissue comprising a base thinly coated on both sides thereof with a composition comprising pyroxylin having a nitrogen content of from 10.5% to 11.4%, a plasticizer of the solvent softener type for the pyroxylin, a blending agent and a wax, the ingredients of the coating being present in such proportions as to provide a transparent, moistureproof, flexible coating having good surface slip and heat sealable to produce a joint which is stronger than a similar joint produced when the material is solvent sealed with acetone.

12. A wrapping tissue comprising a base thinly coated on both sides thereof with a composition comprising 10 parts of pyroxylin having a nitrogen content of from 10.5% to 11.4%, 4 to 12 parts of a plasticizer of the solvent softener type and 0.1 to 1.0 part of a wax, the parts being by weight, the composition providing a transparent, moistureproof, flexible coating having good surface slip and heat sealable to produce a joint which is stronger than a similar joint produced when the material is solvent sealed with acetone.

13. A wrapping tissue comprising a base thinly coated on both sides thereof with a composition comprising 10 parts of pyroxylin having a nitrogen content of from 10.5% to 11.4%, 4 to 12 parts of a plasticizer of the solvent softener type, 1 to 2 parts of a blending agent and 0.1 to 1.0 part of a wax, the parts being by weight, the composition providing a transparent, moistureproof, flexible coating having good surface slip and heat sealable to produce a joint which is stronger than a similar joint produced when the material is solvent sealed with acetone.

MAURICE VALENTINE HITT.